(12) United States Patent
Wakui

(10) Patent No.: US 6,262,767 B1
(45) Date of Patent: Jul. 17, 2001

(54) STILL VIDEO CAMERA, REMOTE CONTROLLER AND CAMERA SYSTEM

(75) Inventor: Yoshio Wakui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/877,994

(22) Filed: Jun. 18, 1997

(30) Foreign Application Priority Data

Jun. 20, 1996 (JP) .................................................. 8-180047

(51) Int. Cl.⁷ ........................................................ H04N 5/225
(52) U.S. Cl. ............................................ 348/211; 348/373
(58) Field of Search ..................................... 348/207, 211, 348/212, 213, 214, 220, 373, 374, 375; H04N 5/225

(56) References Cited

U.S. PATENT DOCUMENTS

| | | | |
|---|---|---|---|
| 5,128,770 | * 7/1992 | Inama et al. | 348/211 |
| 5,146,353 | * 9/1992 | Isoguchi et al. | 348/211 |
| 5,260,795 | 11/1993 | Sakai et al. | . |
| 5,479,206 | * 12/1995 | Ueno et al. | 348/211 |
| 5,864,364 | * 1/1999 | Ohyama et al. | 348/227 |

* cited by examiner

Primary Examiner—Tuan Ho
(74) Attorney, Agent, or Firm—Greenblum & Bernstein, P.L.C.

(57) ABSTRACT

A still video camera in which a command signal from a remote controller is received through a radio communication is provided, so that at least an image pickup operation of the camera can be controlled in accordance with the command signal. The camera includes an image pickup device, a recording medium on which image data of an object image picked-up by the image pickup device is recorded, a recording device for recording the image data on the recording medium in the camera, a signal receiver for receiving the signal from the remote controller, a signal transmitter for radio-transmitting the image data to the remote controller, and a controller for controlling the operation of at least the image pickup device, the recording device, and the signal transmitter. A remote controller and a camera system using the same are also disclosed.

7 Claims, 14 Drawing Sheets

STILL VIDEO CAMERA, REMOTE CONTROLLER AND CAMERA SYSTEM

BACKGROUND OF THE INVENTION

1. Field of the Invention

The present invention relates to a still video camera, a remote controller, and a camera system which is composed of a still video camera and a remote controller.

2. Description of the Related Art

A camera system consisting of a still video camera and a remote controller is well known. A releasing operation is carried out by a remote control operation using the remote controller to take a picture of an object to be photographed.

In a still video camera, an image signal (image data) of an image taken by the camera is recorded (stored) in a non-volatile memory incorporated therein, in which data can be rewritten.

However, since the number of frames which can be recorded in the non-volatile memory is limited, if there is no room for recording the image data in the recording area of the non-volatile memory, it is necessary to erase a part or the whole of the recorded image data in order to record new image data in the non-volatile memory, even if there is no unnecessary image data recorded in the non-volatile memory.

To solve this, it is possible to transmit image data to a personal computer, etc., through a wire or wireless transmission system to thereby record the image data in the memory of the personal computer. However, in this solution it is impossible to record the image data in the absence of a personal computer.

SUMMARY OF THE INVENTION

It is an object of the present invention to provide a still video camera in which image data of an image taken by the camera can be transmitted using a wireless system to a remote controller, a remote controller in which image data can be recorded, and a camera system consisting of a still video camera and a remote controller.

To achieve the object mentioned above, according to the present invention, there is provided a still video camera which receives a command signal from a remote controller through a radio communication, so that at least an image pickup operation of the camera can be controlled in accordance with the command signal, having an image pickup device, a recording medium provided in the camera on which image data of an object image picked-up by the image pickup device is recorded, a recording means provided in the camera for recording the image data on the recording medium, a signal receiving means provided in the camera for receiving the command signal from the remote controller, and a signal transmitting means provided in the camera for radio-transmit ting the image data to the remote controller.

The remote controller has a signal transmitting means provided in the remote controller for radio-transmitting the command signal to the still video camera, a signal receiving means provided in said remote controller for receiving image data of an object image picked-up by the still video camera, a recording medium loading portion provided in the remote controller in which an external recording medium can be detachably loaded, and a recording means provided in the remote controller for recording the image data received by the signal receiving means onto the recording medium loaded in the recording medium loading portion.

The remote controller includes a recording medium loading portion in which an external recording medium can be detachably loaded.

The present disclosure relates to subject matter contained in Japanese Patent Application No. 08-180047 (filed on Jun. 20, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

A still video camera, a remote controller and a camera system according to the present invention will be discussed below.

Figure 1:
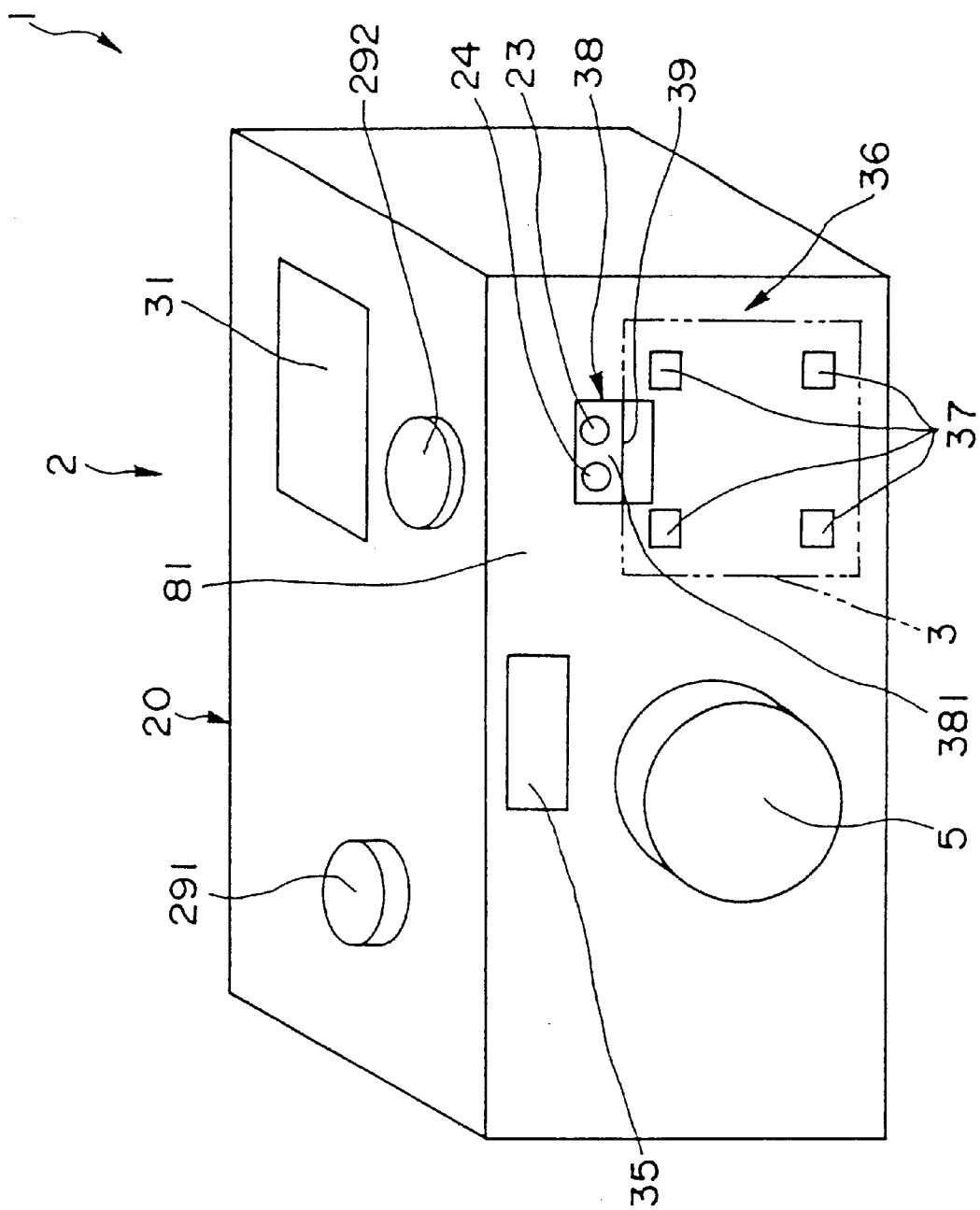
FIG. 1 is a perspective view of a first embodiment of a camera system according to the present invention.

FIG. 1 shows a perspective view of a camera system 1. The camera system 1 consists of a still video camera (digital still camera, digital camera) 2 and a remote controller 3 which is adapted to remotely control various functions of the still video camera 2.

The still video camera 2 includes a body 20 which is provided on a front surface 81 thereof with a photographing optical system (photographing lens) 5. A release switch 291, a mode selection switch 292, and a display portion 31 are provided on an upper surface of the body 20. The camera body 20 is also provided therein with a view finder system 35 which extends between the front surface 81 and a rear surface of the camera body 20.

A remote controller mounting portion 36 to which the remote controller 3 can be mounted, is provided on the front surface 81 of the still video camera 2.

The controller mounting portion 36 is provided with four magnets (permanent magnets) 37 which oppose four corresponding magnets 64 (FIG. 3) of the remote controller 3 when the remote controller 3 is mounted to the controller mounting portion 36. The polarity of the four magnets 37 in opposite to the polarity of the corresponding magnets 64 of the remote controller 3.

Figure 7A:
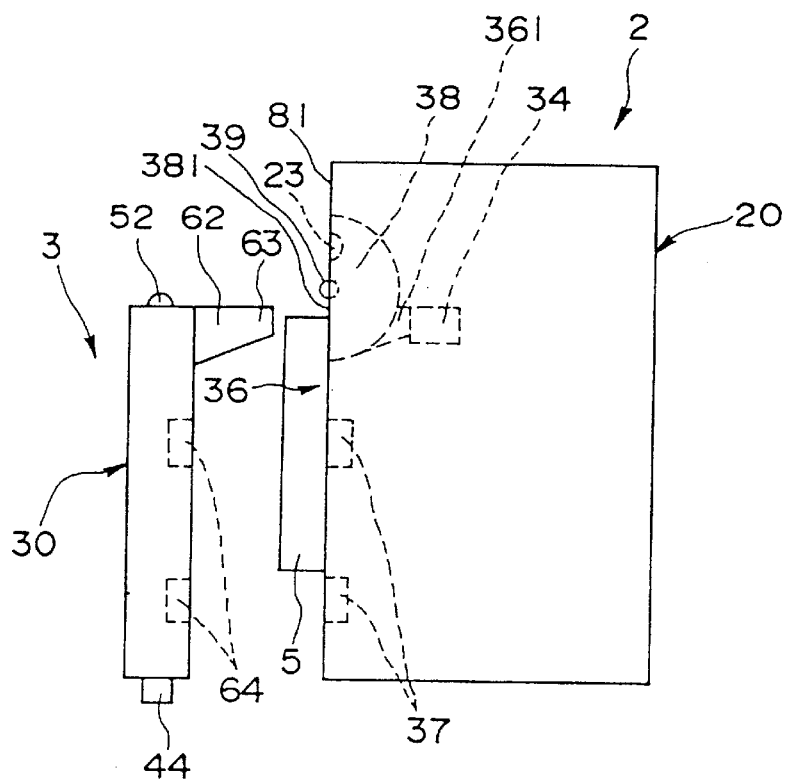
FIGS. 7a and 7b are side elevational views of a remote controller before and after being attached to a still video camera.
Figure 7B:
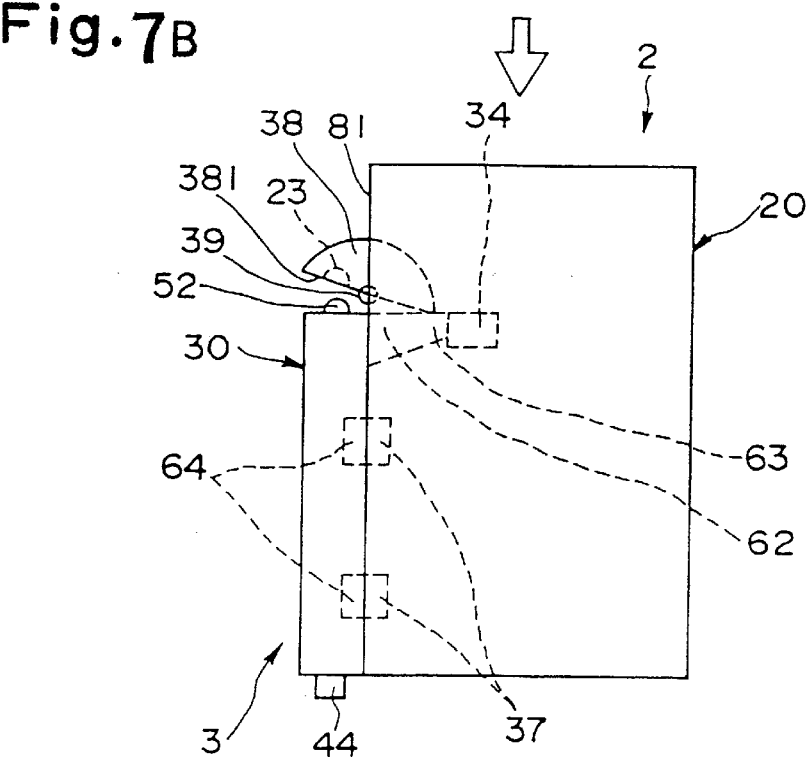

As can be seen in FIGS. 7a and 7b, the controller mounting portion 36 is provided with a hole (controller slot) 361 in which a projection 62 (FIG. 4) of the controller 3 is inserted when the controller 3 is mounted to the controller mounting portion 36. The controller slot 361 is provided on the bottom (innermost portion) thereof with a connector 34 which can be connected to a power source connector 63 of the controller 3.

As shown in FIG. 1, a connector portion is provided in the vicinity of the slot 361. The connector portion consists of an infrared ray emitting diode (signal emitter) 23, a photo diode (signal receiver) 24, and a support member 38 which supports the emitter 23 and the receiver 24. The support member 38 is rotatable about a shaft 39 with respect to the camera body 20 in forward and reverse directions.

The support member 38 is substantially in the form of a semi-cylinder having a plane 381 on which the axis of the shaft 39, about which the support member 38 rotates, lies. The support member 38 is biased by a biasing means (not shown), such as a spring, so that the plane 381 of the support member 38 is substantially flush with the front surface 81 of the camera body 20. Namely, the support member 38 is normally maintained in the position shown in FIG. 1.

The infrared ray emitting diode 23 and the photo diode 24 are located on the upper portion of the front surface of the support member 38 (in FIG. 1) and are exposed to the front surface 81 of the camera body 20.

The support member 38, the infrared ray emitting diode 23 and the photo diode 24 are arranged such that the infrared ray emitting diode 23 and the photo diode 24 are respectively opposed to a photo diode 52 and an infrared ray emitting diode 49 (FIG. 2) of the remote controller 3, when the remote controller 3 is mounted to the camera body 2.

With this arrangement, the infrared ray communication (radio communication) between the still video camera 2 and the remote controller 3 can be carried out not only when the remote controller 3 is mounted to the camera, but also when the remote controller 3 is detached from the camera 2.

Figure 2:
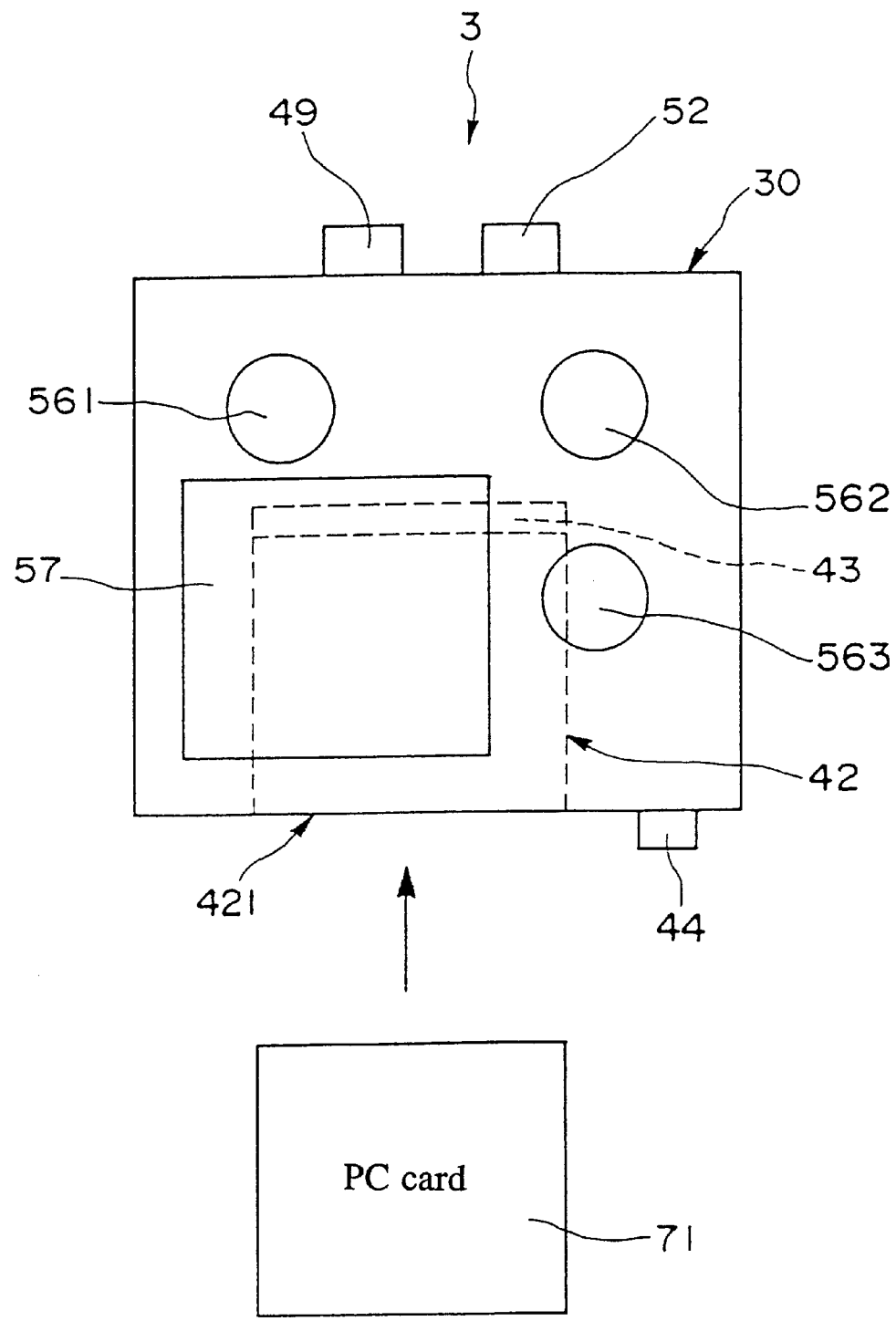
FIG. 2 is a front elevational view of a remote controller of the first embodiment shown in FIG. 1.

As can be seen in FIG. 2, the remote controller 3 has a casing 30 which is provided on the front surface thereof with a release switch 561, a mode selection switch 562, a CR mode reset switch 563, and a display portion 57, and on the upper surface thereof with the infrared ray emitting diode (signal emitter) 49 and the photo diode (signal receiver) 52.

Figure 3:
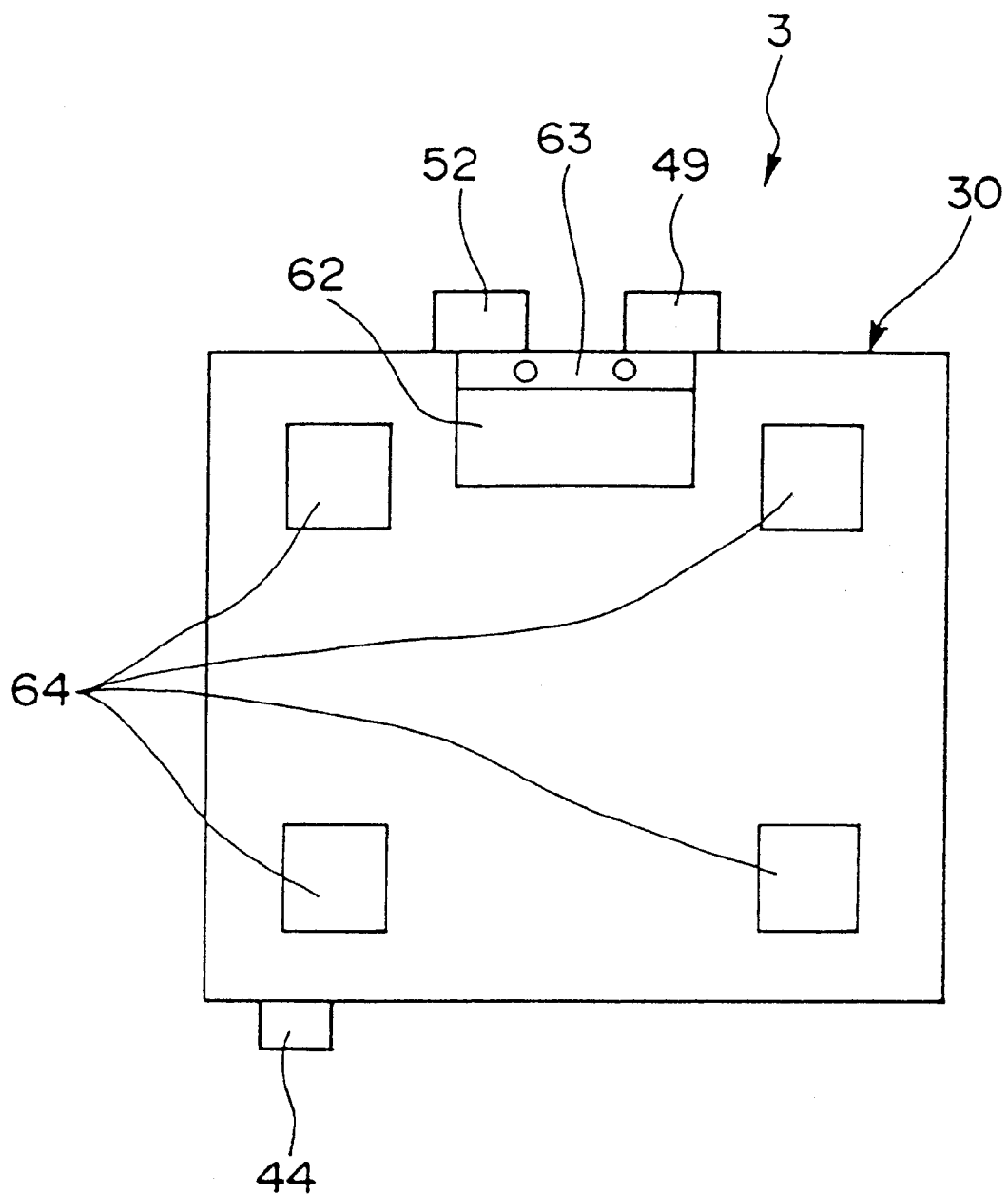
FIG. 3 is a rear view of the remote controller shown in FIG. 2.

As can be seen in FIG. 3, the casing 30 is provided on the rear surface thereof with the magnets (permanent magnets) 64.

Figure 4:
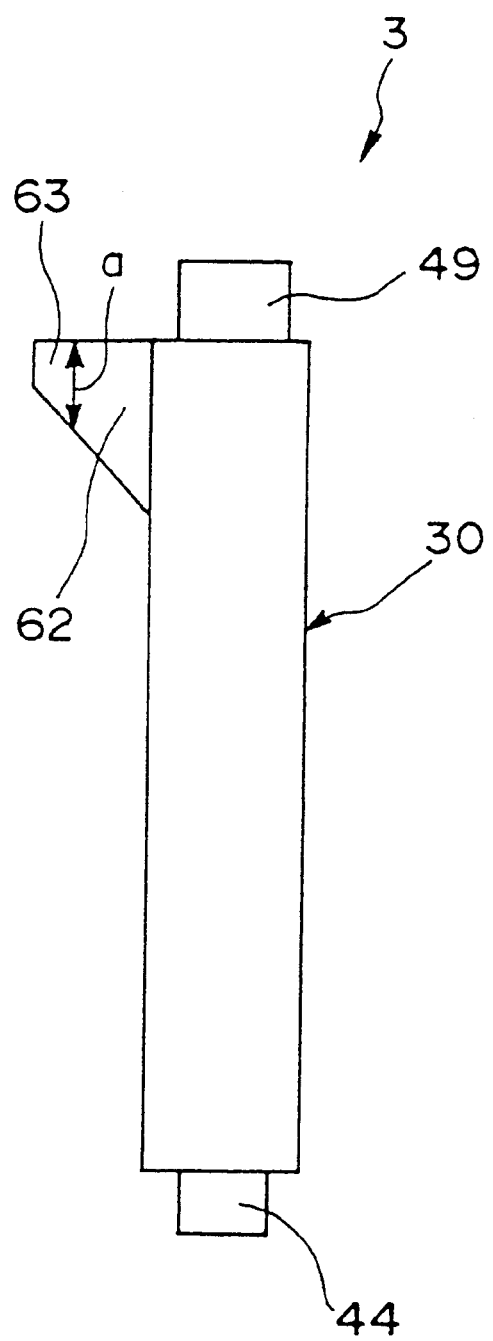
FIG. 4 is a side elevational view of the remote controller shown in FIG. 2.

Looking at FIGS. 3 and 4, the projection 62 is provided on the upper portion of the rear surface of the casing 30 and projects in the left direction (in FIG. 4) to constitute a posture changing means. The width "a" of the projection 62 in the vertical direction in FIG. 4 gradually decreases in the leftward direction. The power source connector 63 is provided on the front end (left end in FIG. 4) of the projection 62.

The projection 62 functions as a guide member to guide the connector 63 so as to connect the latter to the connector 34 of the still video camera 2 when the remote controller 3 is attached to the controller mounting portion 36 of the still video camera 2.

The remote controller 3 is provided with a card loading portion (card slot) 42 in which a PC card (IC memory card) 71 is inserted, and an ejector button (lever) 44 which is adapted to eject the PC card 71. The card loading portion 42 is provided on the innermost portion thereof with a connector 43.

The card loading portion 42 has an insertion opening 421 which opens in the downward direction in FIG. 2. The ejector lever 44 is located on the lower end surface of the casing 30 in FIG. 2. Thus, the insertion of the PC card 71 in the card loading portion 42 and the removal thereof from the card loading portion 42 can be certainly carried out not only when the remote controller 3 is detached from the camera body but also when the remote controller 3 is attached to the camera body 20.

The PC card 71 is provided with an IC (Integrated Circuit) memory incorporated therein to record (store) image signals (image data). The PC memory is an external card memory which can be detachably attached to the remote controller 3. The external card memory 71 has an area in which the image data is recorded and an area in which data inherent to the card (inherent card data) is recorded. The inherent card data includes, for example, the type of memory (e.g., static RM, flash memory, etc.), the storage capacity of the memory, or access speed, etc.

When the PC card 71 is to be loaded in the card loading portion 42, the PC card 71, which is held by an operator's hand, is inserted in the insertion opening 421 until the PC card 71 reaches the innermost portion of the card loading portion 42 and thereafter, the PC card is further depressed to connect the connector terminal of the PC card to the connector terminal of the connector 43.

The remote controller 3 is provided with a card conveyance mechanism (not shown) which is actuated by an operation of the ejector lever 44 to discharge the PC card 71 from the card loading portion 42.

Figure 5:
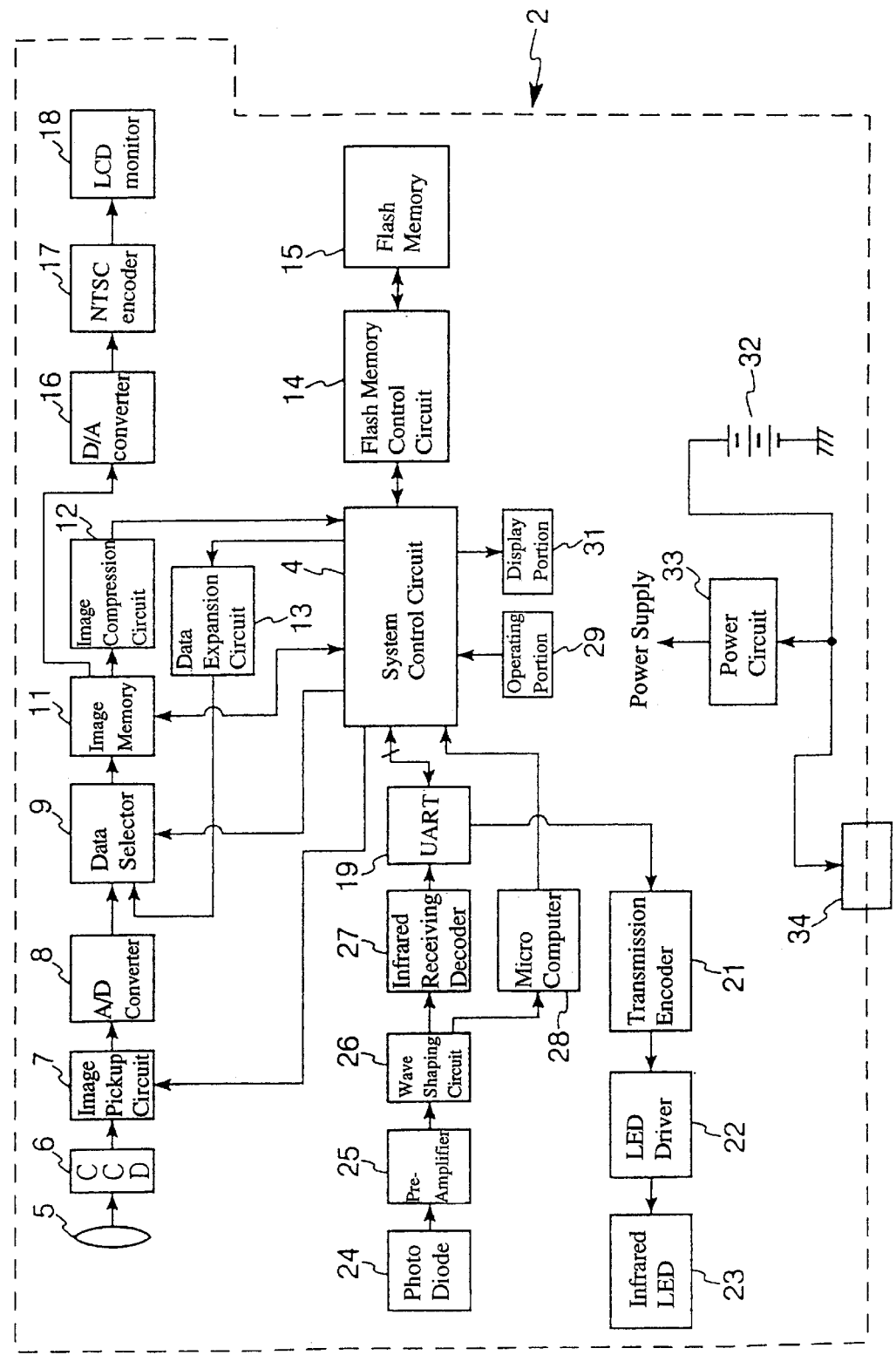
FIG. 5 is a block diagram showing circuitry in a still video camera shown in FIG. 1.

The still video camera 2 includes an image pickup portion having a CCD (image pickup device) 6 and an image pickup circuit 7, as shown in FIG. 5. The CCD 6 consists of a large number of pixels in a matrix arrangement. Each pixel accumulates therein electric charges corresponding to the amount of light received thereby and the accumulated charges are successively transferred at a predetermined time. The CCD 6 is disposed on an image pickup surface located behind the photographing lens system 5.

The image pickup circuit 7 controls the CCD 6 to read and process the signals recorded in the CCD 6. The input terminal of the image pickup circuit 7 is connected to the output terminal of the CCD 6.

In the illustrated embodiment which is applied to a still video camera 2 for photographing a color image, a CCD of complementary color filter type is used as the CCD 6. Each pixel (smallest unit) of the CCD 6 is provided with filters which separate magenta (Mg), yellow (Ye), cyan (Cy) and green (G). An image of an object is formed on the light receiving surface of the CCD 6 by the photographing lens system 5.

The still video camera 2 includes a system control circuit (control means) 4. The system control circuit 4 can be made of, for example, a micro computer which controls various functions of the still video camera, such as a sequence control or an infrared ray comunication, etc.

The system control circuit 4 is connected to an operating portion 29 and a display portion 31.

The operating portion 29 is provided with the power switch (main switch), the release switch 291, and the mode selection switch 292 which is actuated to select one of the modes consisting of record mode/reproduction mode/erase model CR mode (i.e., transmission mode in which a signal is transmitted from the still video camera to the remote controller)/RC mode (i.e.,transmission mode in which a signal is transmitted from the remote controller to the still video camera).

For instance, necessary information regarding the ON/OFF state of the power switch, etc., the selected mode (record mode, reproduction mode, erase mode, CR mode, RC mode), year-month-day on which the object image is taken, current time, etc., is indicated in the display portion 3AL using a liquid crystal display (LCD) or a light emitting element, etc.

The power of a power source 32 is supplied to predetermined circuits (elements) of the still video camera 2 through a power circuit 33. A terminal of a power source connector 34 is connected to the power source 32.

Figure 6:
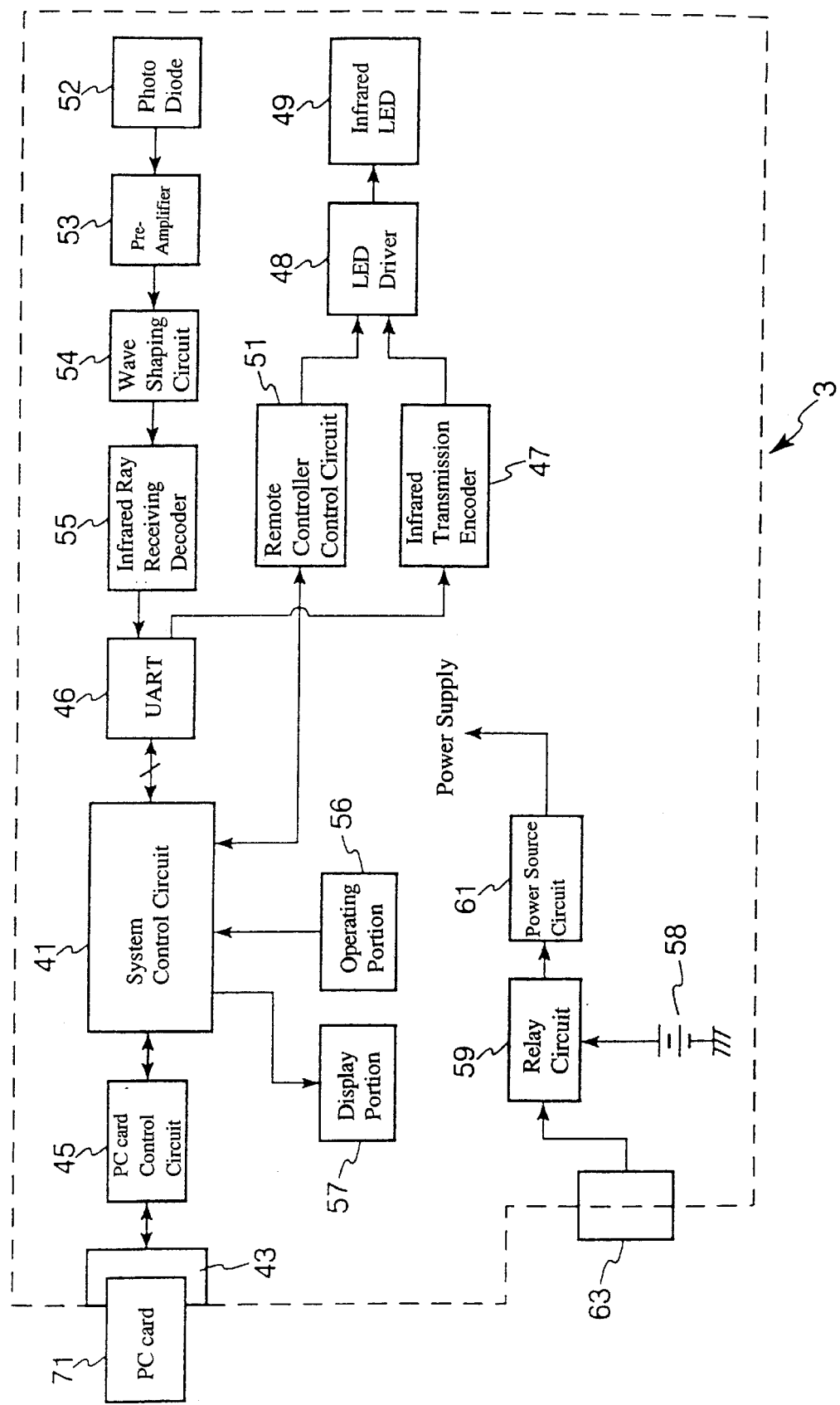
FIG. 6 is a block diagram of a control circuit of the remote controller shown in FIG. 2.

As shown in FIG. 6, the remote controller 3 has a system control circuit (control means) 41 which can be made of a micro computer to control various functions of the remote controller 3, such as the sequence control or the infrared ray communication, etc.

The system control circuit 41 is connected to an operating portion 56. a display 57, a remote controller control circuit (microcomputer) 51, and a PC card control circuit 45 which perform a general control functions, such as recording or reading data in or from the memory of the PC card 71. The PC card control circuit 45 is connected to the connector 43.

The operating portion 56 is provided with a power switch (main switch), the release switch 561, the mode selection switch 562 which is actuated to select the CR mode or the RC mode, and the CR mode reset switch 563, etc.

For instance, necessary information regarding the ON/OFF state of the power switch, etc., the selected moda (CR mode or RC mode), and the presence or absence of the PC card 71 is indicated in the display portion 57 using a liquid crystal display (LCD) or a light emitter, etc. The terminal of the power source connector 63 is connected to a relay circuit 59.

As can be seen in FIGS. 3 and 6, when the remote controller 3 is attached, that is, when the terminal of the connector 34 is connected to the terminal of the connector 63, the power of the power source 32 is supplied to the relay circuit 59, so that the relay circuit 59 turns the power source 58 OFF. The power of the power source 32 is supplied to predetermined circuits (elements) of the remote controller 3 through the power source circuit 61.

When the remote controller 3 is detached from the still video camera, that is, when no terminal of the connector 34 is connected to the terminal of the connector 63, the relay circuit 59 turns the power source 58 ON. Consequently, the power of the power source 58 is supplied to predetermined circuits (elements) of the remote controller 3 through the power source circuit 61.

The operation of the camera system 1 will be explained following a synopsis of the camera system 1.

In the camera system 1, not only can an object image be picked-up in accordance with a remote control operation by the remote controller 3, but also the image signal (image data) of the picked-up object image can be transmitted from the still video camera 2 to the remote controller 3 through an infrared ray communication (radio communication) so that the image data can be recorded in the memory of the PC card 71 on the remote controller side.

The image data recorded in the memory of the PC card 71 is transmitted from the remote controller 3 to the still video camera 2 through the infrared ray communication, so that the image data can be reproduced or recorded in the flash memory 15 in the still video camera 2.

The infrared ray communication can be carried out between the still video camera 2 and the remote controller 3 not only when the remote controller 3 is attached to the still video camera 2 but also when the remote controller 3 is detached therefrom.

The operation when the remote controller 3 is mounted to the controller mounting portion 36 of the still video camera 2 will be discussed below with reference to FIGS. 7a and 7b.

When the remote controller 3 is not attached to the still video camera 2, the support member 38 is held in a first position shown as in FIG. 7a by a biasing means (not shown). Upon attachment of the remote controller 3 to the controller mounting portion 36, the remote controller 3 is held by an operator's hand and is disposed in place to be opposed to the still video camera 2. The remote controller 3 is moved in the right direction as viewed in FIG. 7b to press the support member 38 by the projection 62, so that the support member 38 is rotated in the counterclockwise direction against the biasing means. Consequently, the projection 62 is inserted in the hole 361, and the terminal of the connector 63 is connected to the terminal of the connector 34.

The remote controller 3 is firmly connected to the controller mounting portion 36 due to the magnetic attraction produced between the magnets 64 and the magnets 37. The end of the support member 38 abuts against the upper surface of the projection 62, so that the support member 38 is held in a second position shown in FIG. 7b.

When the remote controller 3 is attached to the still video camera 2, the infrared ray emitting diode 49 and the photo diode 52 of the remote controller 3 are respectively opposed to the photo diode 24 and the infrared ray emitting diode 23 of the still video camera 2. Thus, the infrared emitted from the infrared ray emitting diode 23 are received by the photo diode 52, and the infrared emitted from the infrared ray emitting diode 49 are received by the photo diode 24.

To detach the remote controller 3 from the controller mounting portion 36 of the still video camera 3, the remote controller 3 is moved in the left direction as viewed in FIG. 7b against the magnetic attraction of the magnets 641 and 37, so that the projection 62 is withdrawn from the hole 361. The support member 38 is rotated in the clockwise direction by the biasing force of the biasing means and is returned to and held in the first position shown in FIG. 7a.

The controller of the camera system 1 operates as follows.

In the still video camera 2, the mode set commands, i.e., the record mode set command, the reproduction mode set command, the erase mode set command, the CR mode set command, and the RC mode set command, are cyclically input to the system control circuit 4 each time the mode selection switch 292 is actuated.

The system control circuit 4 sets the "record mode", "reproduction mode", "erase mode", OCR modem, or "RC mode" is in accordance with the mode set command.

The CR mode refers to a transmission mode of the still video camera 2 in which the signal is transmitted from the still video camera 2 to the remote controller 3 (i.e., the receipt mode of the remote controller 3), and the RC mode refers to a transmission mode of the remote controller 3 in which the signal is transmitted from the remote controller 3 to the still video camera 2 (i.e., the receipt mode of the still video camera 2), as mentioned before.

In the still video camera 2, when the release switch 29 of the camera body is turned ON in the record mode, reproduction mode, erase mode, CR mode, and RC mode, an image pickup/record trigger, a reproduction trigger, an erase trigger, a transmission trigger, a receipt trigger, and a record trigger, are input to the system control circuit 4, respectively. In response to the detection of the image pickup/record trigger, the reproduction trigger, the erase trigger, the transmission trigger, the receipt trigger, and the record trigger, the recording operation (image pickup and record), the playing operation (commencement or stop of the playing operation), the erase, the transmission and the recording operation are carried out.

In the remote controller 3, when the mode selection switch 562 is actuated in the neutral position (i.e., in neither the CR mode nor the RC mode), the RC mode set command is input to the system control circuit 41. If the mode selection switch 562 is actuated in the RC mode, the CR mode set command is input to the system control circuit 41. If the CR mode reset switch 563 is turned ON in the CR mode, the CR mode reset command is input to the system control circuit 41.

The system control circuit 41 sets the "CR mode" or the "RC mode" in response to the mode set command. The system control circuit 41 releases the CR mocd when the CR mode reset command is detected. Consequently, the neutral position is obtained.

In the remote controller 3, when the release switch 561 is actuated in the neutral position, the image pickup/record command is input to the system control circuit 41. If the release switch 561 is actuated in the RC mode, the transmission trigger is input to the system control circuit 41. In accordance with the detection of the image pickup/record command and the transmission trigger, the transmission of the image pickup/record trigger and the image data is carried out.

The operation of the camera system 1 in each mode will be described below.

1) <Still Video Camera 2: Record Mode>

As mentioned above, when the record mode set command is input to the system control circuit 4 in accordance with the operation of the mode selection switch 292 by an operator, the record mode is set by the system control circuit 4.

If the release switch 291 of the camera body is turned ON, the image pickup/record trigger is input to the system control circuit 4, and in synchronization with this, the exposure operation for the CCD 6 is carried out under predetermined conditions. Consequently, electric charges depending on the amount of light corresponding to the object image are accumulated in each pixel of the CCD 6. The accumulated charges are successively transferred to the image pickup circuit 7.

The signal output from the CCD 6 is subject to a predetermined signal processing operation in the image pickup circuit 7 to obtain an analog image signal of the object image photographed, i.e., an analog brightness signal (Y) and an analog chromatic signal (C).

The analog image signal is converted into a digital image signal (image data), i.e., a digital brightness signal (Y) and a digital chromatic signal (C), by an A/D converter 8. The digital signals are written at a predetermined address of the image memory 11 through a data selector 9 which selects a receiver. The selection in the data selector 9 is controlled by the system controller 4.

Thereafter, the digital image signal is read from the predetermined address of the image memory 11.

The digital image signal thus read is compressed by an image compression circuit 12 and is input to the flash memory control circuit 14 through the system control circuit 4. Consequently, the image signal is recorded (stored) is the flash memory (non-volatile memory in which data is; erasable and rewritable) 15 at a predetermined address. Note that in the illustrated embodiment, the image data for one image (image plane) is stored in the flash memory 15.

In the case that the image pickup is carried out in accordance with a remote control operation by the remote controller 3, the upper surface of the remote controller 3 is opposed to the front surface of the still video camera 2.

As shown in FIG. 6, if the release switch 561 of the remote controller 3 is turned ON, the LED driver 48 is activated by the remote controller control circuit 51 to drive the infrared LED 49 to thereby emit infrared. Consequently, the signal which represents the image pickup/record trigger is transmitted.

This signal, i.e., the infrared received by the photo diode 24 of the still video camera 2, is amplified by a preamplifier 25, and is then shaped by a wave shaping circuit 26, before being input to an infrared ray receiving decoder 27 and a micro computer 28 for the remote controller. Note that the infrared ray receiving decoder 27 does not operate even if the signal is input thereto from the wave shaping circuit 26 (no demodulation of the signals is effected).

The image pickup/record trigger is produced in the micro computer for the remote controller, in accordance with the signal input from the wave shaping circuit 26.

The image pickup/record trigger is input to the system control circuit 4 and, in synchronization therewith, the exposure for the CCD 6 is carried out under predetermined exposure conditions. Consequently, electric chargers depending on the quantity of light depending on the object image are accumulated in each pixel of the CCD 6. The subsequent operations are the same as those mentioned above, and hence no explanation thereof will be given hereinafter.

2) <Still Video Camera 2: Reproduction Mode>

As mentioned before, when the reproduction mode set command is input to the system control circuit 4 in accordance with the operation of the mode selection switch 292 by the operator, the reproduction mode is set by the system control circuit 4.

If the release switch 291 of the camera body is turned ON, the reproduction trigger is supplied to the system control circuit 4 to thereby commence the reproduction of the image data.

The digital image signal (image data) is read from the flash memory 15 at a predetermined address by the flash memory control circuit 14 as shown in FIG. 5. The digital signal thus read is supplied to a data expansion circuit 13 through the system control circuit 4.

The read digital image signal is expanded into the original form by the data expansion circuit 13 and is recorded in the image memory 11 at a predetermined address through the data selector 9. The switching operation of the data selector 9 is controlled by the system control circuit 4.

Thereafter, the digital image signal is read from a predetermined address of the image memory 11.

The digital image signal thus read is converted into an analog image signal by a D/A converter 16 and is input to the NTSC encoder 17. An NTSC system standard TV signal (video signal) is generated in the NTSC encoder 17, based on the analog image signal, i.e., the brightness signal (Y) and the chromatic signal (C), and the synchronization signal which is input from a synchronization signal generating circuit (not shown) to the NTSC encoder 17.

The standard TV signal thus generated is output from the NTSC encoder 17 and is input to and reproduced in the LCD monitor (display means) 18. Consequently, the reproduced image signal (electronic image) is displayed in the LCD monitor 18.

When the release switch 291 of the camera body is turned ON, the reproduction trigger is supplied to the system controller 4 to stop the reproduction.

3) <Still Video Camera 2: Erase mode>

When the erase mode set command is input to the system controller 4 in accordance with the operation of the mode selection switch 292 by an operator, the erase mode is set by the system controller 4.

When the release switch 291 of the camera body is turned ON, the erase trigger is supplied to the system control circuit 4 to perform the erasing of the data.

The digital image signals (image data) are erased from the flash memory 15 at a predetermined address by the flash memory control circuit 14, as shown in FIG. 5.

4) <Still Video Camera 2: CR mode, Remote controller 3: CR Mode>

Upon transmission of the signal from the still video camera 2 to the remote controller 3, the recorded data is reproduced to confirm the data to be transmitted. The digital image signal (image data) read from the flash memory at a predetermined address during the reproduction is written in the image memory 11 at a predetermined address.

When the CR mode set command is supplied to the system control circuit 4 in accordance with the operation of the mode selection switch 292 by an operator, the still video camera 2 is set to the CR mode by the system controller 4.

When the CR mode set command is supplied to the system control circuit 41 in accordance with the operation of the mode selection switch 562 by an operator, the remote controller 3 is set to the CR mode by the system controller 41.

When the release switch 291 of the camera body is turned ON, the transmission trigger is supplied to the system controller 4 to transmit the data to the still video camera 2. The digital image signal is read from a predetermined address of the image memory 11, as shown in FIG. 5.

The read digital image signal is compressed by the image compression circuit 12 and is supplied to a UART (Universal Asynchronous Receiver Transmitter) 19 through the system controller 4. The digital image signal (parallel signal) is converted to an asynchronous serial signal (UART frame) in the UART 19. The serial signal is supplied to the infrared ray transmission encoder 21 where the signal is modulated to a signal (IR frame) according to the IrDA (Infrared Data Association) system. The signal is thereafter supplied to the LED driver 22.

Figure 8A:
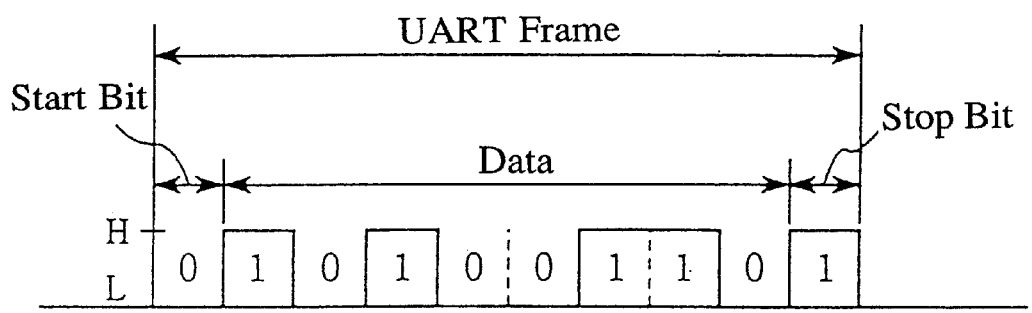
FIGS. 8a and 8b are timing charts showing the structure of an asynchronous serial signal (UART frame) and a signal according to an IrDA system (Ir frame)
Figure 8B:
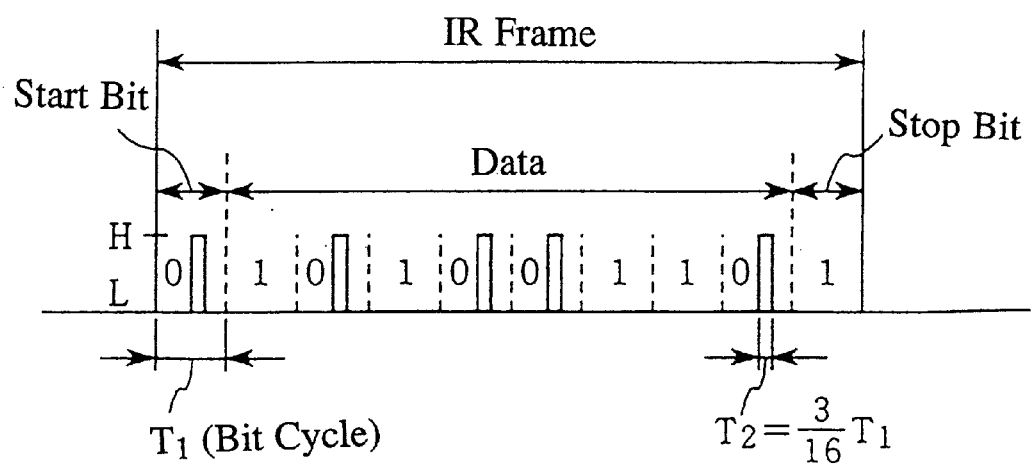

FIGS. 8a and 8b are timing charts showing the structure of the asynchronous serial signal (UART frame) and the signal (IR frame) according to the IrDA system.

In FIG. 8a, the asynchronous serial signal (UART frame) consists of a start bit "0", a stop bit "1" and binary data "0" or "1" therebetween. The signal is No, and "1" when the signal level is low (L) and high (H), respectively. As can be seen in FIG. 8b, the signal (IR frame) according to the IrDA system consists of a start bit "0", a stop bit "1" and binary data "0" or "1" therebetween. The signal is "0" and "1" when the signal level is high and low, respectively.

Assuming that the bit cycle is T1 and the pulse width, i.e., the period of time in which the signal level is kept high is T2, T2=3T1/16.

At "1", no infrared radiation occurs, and at "0", infrared is emitted from the infrared LED 23 for T2. In the camera system 1, the UART frame is converted to the IR frame before the communication begins, so that the emission time of the infrared LED 23 at "0" is reduced 3/16 times as short. Thus, the power consumption in the infrared LEDs 23, 49, etc., can be reduced.

As can be seen in FIG. 5, the LED driver 22 operates in response to the signal input from the infrared ray transmission encoder 21 to activate the infrared LED 23 which emits infrared in a predetermined pattern. Consequently, the signal according to the IrDA system is transmitted from the infrared LED 23.

As shown in FIG. 6, the signal, i.e., the infrared received by the photo diode 52 of the remote controller 3. are then amplified by the pre-amplifier 53, are shaped by the wave shaping circuit 54, and are then supplied to the infrared ray receiving decoder 55.

The signal (IR frame) according to the IrDA system supplied from the wave shaping circuit 54 is demodulated into an asynchronous serial signal (UART frame) in the infrared ray receiving decoder 55. The serial signal, i.e., the digital image signal is input to the UART 46 where the serial signal is converted into a parallel signal.

The digital image signal is supplied to the PC card control circuit 45 through the system control circuit 41 and is recorded (stored) in the memory of the PC card 71 at a predetermined address.

5) <Still Video Camera 2: RC mode, Remote Controller 3: RC mode>

Upon transmission of the signal from the remote controller 3 to the still video camera 2, the user selects a desired image (image to be transmitted) using the operating portion 56 of the remote controller 3. Consequently, the frame number of the selected image is indicated in the display portion 57.

When the RC mode set command is supplied to the system acontrol circuit 4 in accordance with the operation of the mode selection switch 292 by the user, the still video camera is set in the RC mode by the system controller 4.

When the RC mode set command is supplied to the system control circuit 41 in accordance with the operation of the mode selection switch 562 by the user, the remote controller 3 is set in the RC mode by the system controller 41.

When the release switch 561 of the remote controller is turned ON, the transmission trigger is sent to the system control circuit 41, so that the remote controller 3 transmits the signal.

As shown in FIG. 6, the digital image signal (image data) is read from the memory of the PC card 71 at a predetermined address by the PC card control circuit 45. The digital image signal is sent to the UART 46 through the system control circuit 41. The digital image signal (parallel signal) is converted to an asynchronous serial signal (UART frame) in the UART 46.

The serial signal is sdnt to the infrared ray transmission encoder 47 in which the serial signal is modulated to a signal (IR frame) according to the IrDA system and is supplied to the LED driver 48. The latter operates in response to the signal input from the infrared ray transmission encoder 47 to activate the infrared LED 49 which emits infrared in a predetermined pattern. Consequently, the signal according to the IrDA system is transmitted from the infrared LED 49.

As shown in FIG. 5, the signal, i.e., the infrared is received by the photo diode 24 of the still video camera 2, is amplified by the pre-amplifier 25, is then shaped by the wave shaping circuit 26, before being supplied to the infrared ray receiving decoder 27 and the remote control signal receiving micro computer 28.

The remote control signal receiving micro computer 28 does not operate even if the signal is supplied thereto from the wave shaping circuit 26. The signal (IR frame) according to the IrDA system supplied from the wave shaping circuit 26 is demodulated into an asynchronous serial signal (UART frame) in the infrared ray receiving decoder 27. The serial signal, i.e., the digital image signal, is input to the UART 19 where the serial signal is converted into a parallel signal. The digital image signal is supplied to the image data expansion circuit 13 through the system control circuit 4. The digital image signal is expanded into the original form by the data expansion circuit 13 and is written in the image memory 11 at a predetermined address through the data selector 9.

Thereafter, the digital image signal is read from the image memory 11 at a predetermined address.

The digital image signal thus read is converted into an analog image signal by the D/A converter 16 and is input to the NTSC encoder 17. An NTSC system standard TV signal is generated in the NTSC encoder 17, based on the analog image signal, i.e., the brightness signal (Y) and the chromatic signal (C), and the synchronization signal which is supplied from a synchronization signal generating circuit (not shown) to the NTSC encoder 17.

The standard TV signal thus generated is output from the NTSC encoder 17 and is input to and reproduced in the LCD monitor 18. Consequently, the reproduced image signal is displayed in the LCD monitor 18.

When the release switch 291 of the camera body is turned ON, the record trigger is supplied to the system controller 4 to read the digital image signal from the image memory 11.

The read digital image signal is compressed by the image data compression circuit 12 and is supplied to the flash memory control circuit 14 through the system controller 4. The digital image signal is recorded in the flash memory 15 at a predetermined address by the flash memory control circuit 14.

The operation of the system control circuit 4 of the still video camera 2 and the system control circuit 41 of the remote controller 3 will be discussed below. The discussion will be first addressed to the system controller 4 of the still video camera 2.

Figure 9:
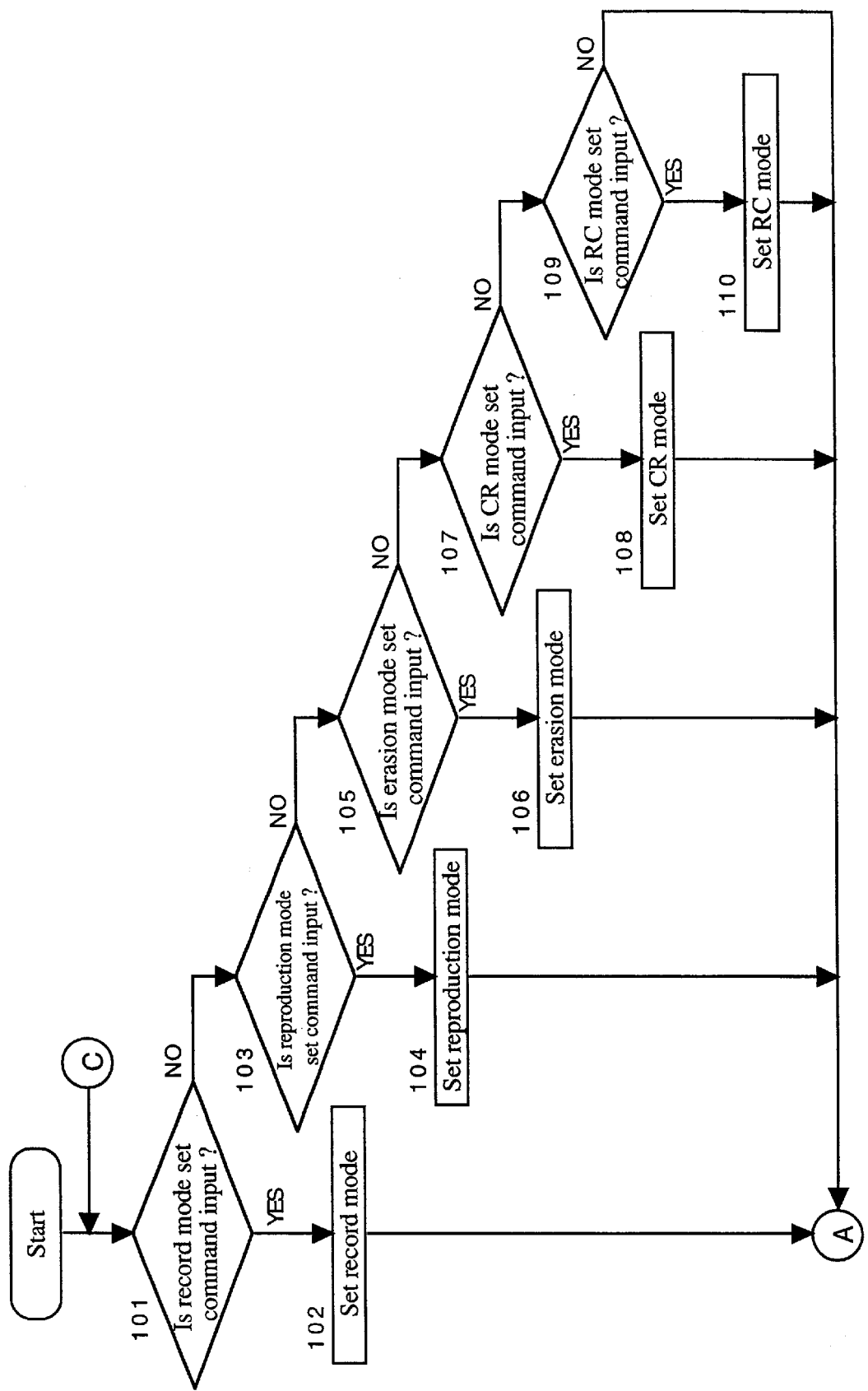
FIGS. 9 through 11 are flow charts of a control operation of a system control circuit of a still video camera according to the present invention.
Figure 10:
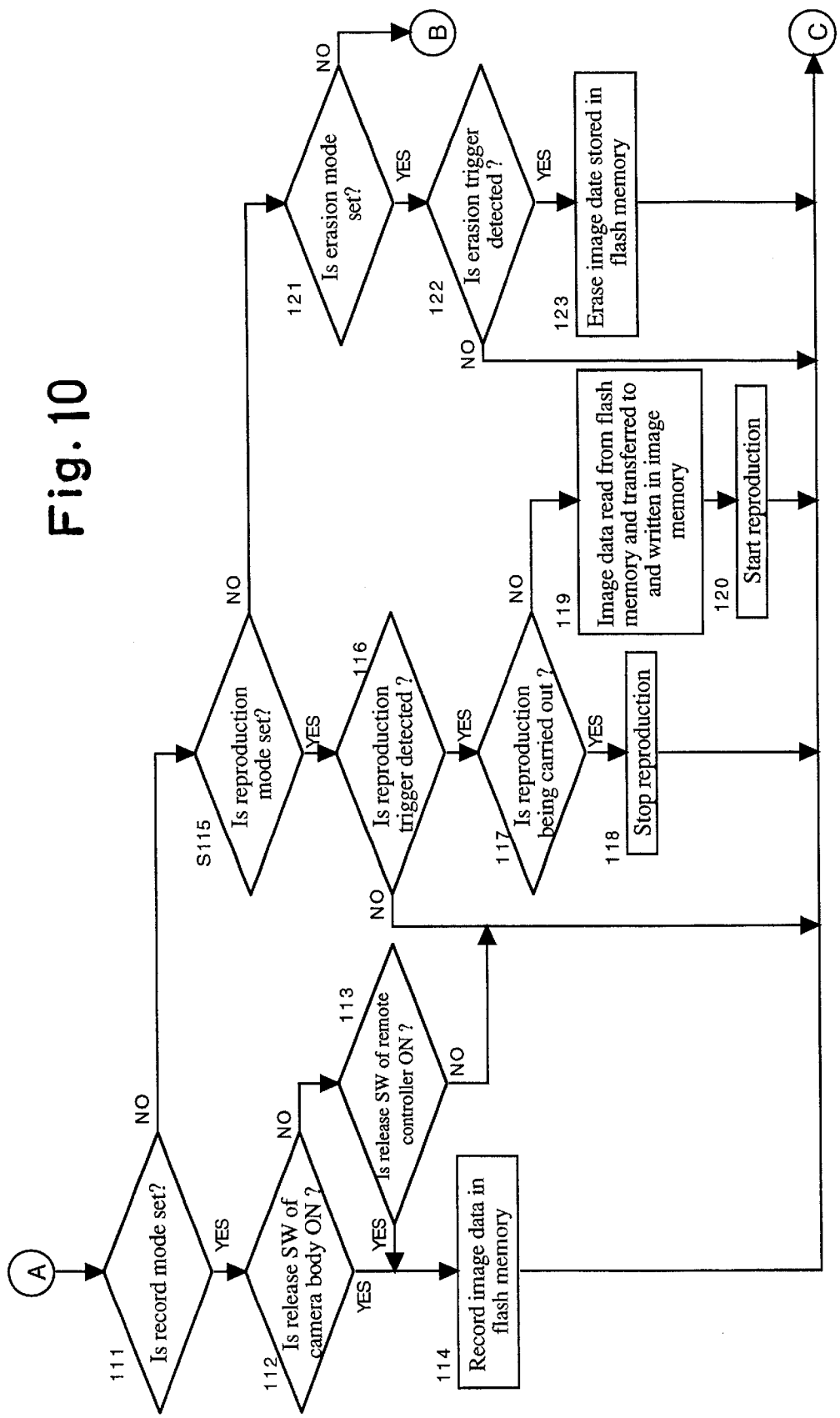
Figure 11:
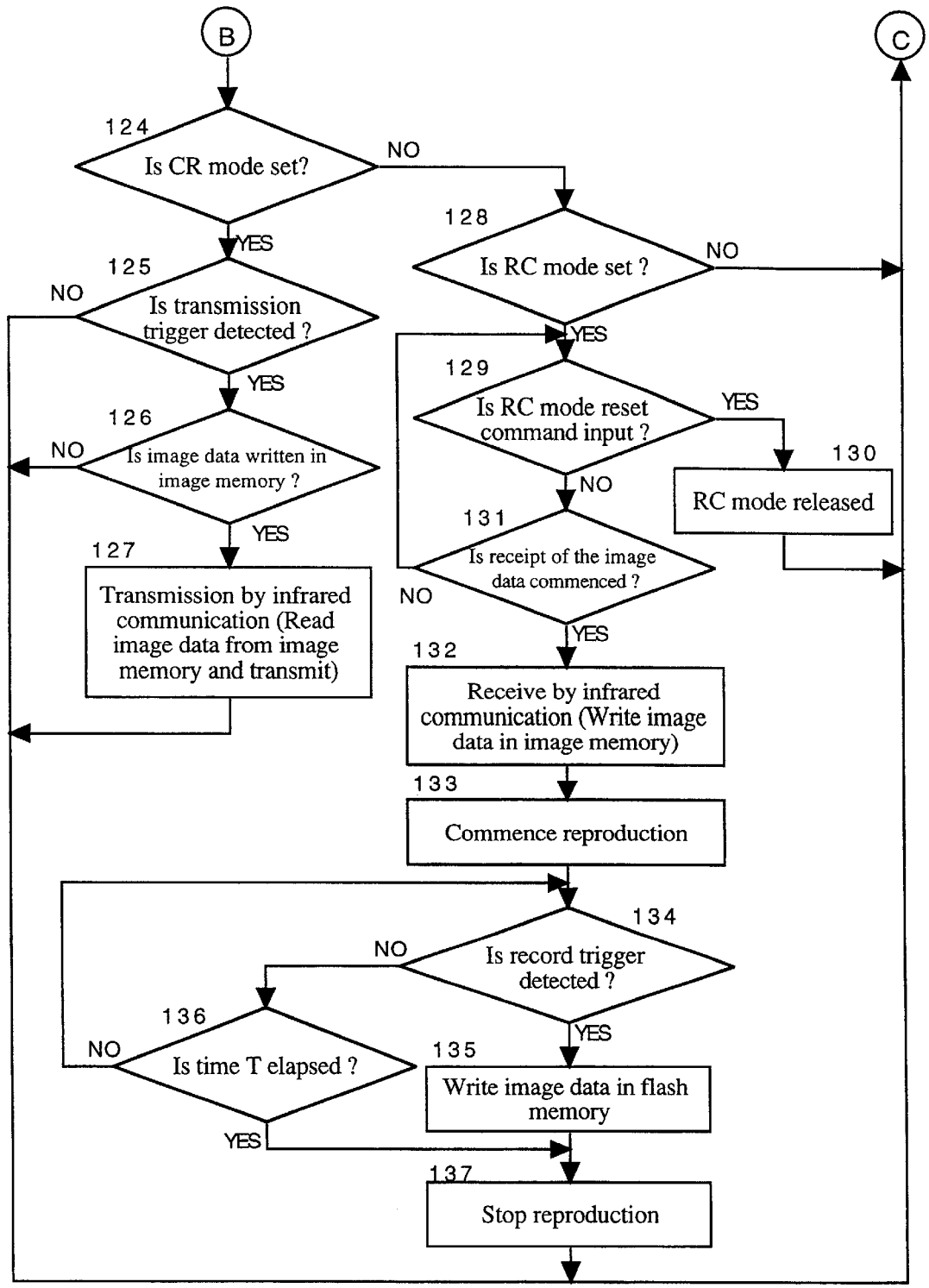

FIGS. 9, 10 and 11 are flow charts showing the control operation of the system control circuit 4.

Whether or not the record mode set command is input is checked (step 101). If the record mode set command is input at step 101, the record mode is set (step 102). If no record mode set command is input, whether or not the reproduction mode set command is input is checked (step 103). If the reproduction mode set command is input, the reproduction mode is set (step 104). Conversely, if no reproduction mode set command is input, whether or not the erase mode set command is input is checked (step 105).

If the erase mode set command is input at step 105, the erase mode is set (step 106). If no erase mode set command is input, whether or not the CR mode set command is input is checked (step 107). If the CR mode set command is input, the CR mode is set (step 108). Conversely, if no CR mode set command is input at step 107, whether or not the RC mode set command is input is checked (step 109). If the RC mode set command is input at step 109, the RC mode is set (step 110). If no RC mode set command is input after the operation at step 102, 104, 106 or 108 or at step 109, whether or not the record mode is set is checked (step 111).

If the record mode is set at step 111, whether or not the release switch 291 of the camera body is ON is checked at step 112. If the release switch 291 is OFF, whether or not the release switch 561 of the remote controller is ON is checked at step 113.

If the release switch 561 of the remote controller is ON at step 113, or the release switch of the camera body is ON at step 112, the image pickup and the recording of the image data in the flash memory 15 are carried out as mentioned above (step 114).

When the image pickup/record trigger is input prom the camera release switch 291, it is judged that the camera release switch 291 is ON. When the signal which represents the image pickup/record trigger is supplied from the remote controller 3, it is judged that the remote controller release switch 561 is ON.

If no record mode is set at step 111, whether or not the reproduction mode is set is checked at step 115. If the reproduction mode is set at step 115, whether or not the reproduction trigger is detected is checked at step 116. If the reproduction trigger is detected at step 116, whether or not the reproduction is being carried out is checked at step 117. When the standard TV signal is output from the NTSC encoder 17 at step 116, it is judged that the reproduction is being carried out. Conversely, when no standard TV signal is output at step 116, it is judged that no reproduction is carried out.

If the reproduction is being carried out at step 116, the reproduction is stopped (step 118).

If it is judged that no reproduction is carried out at step 117, the image data is read from the flash memory 15 and is transferred to and stored in the image memory 11 (step 119). Thus, the image is reproduced at step 120.

If no reproduction mode is set at step 115, whether or not the erase mode is set is checked at step 121. If the erase mode is set at step 121, whether or not the erase trigger is detected is checked at step 122. If the erase trigger is detected at step 122, the image data stored in the flash memory 15 is erased (step 123). Conversely, if no erase mode is set at step 121, whether or not the CR mode is set is checked at step 124.

If the CR mode is set at step 124, whether or not the transmission trigger is detected is checked at step 125. If the transmission trigger is detected at step 125, whether or not the image data is written in the image memory 11 is checked at step 126. If the image data is written in the image memory 11 at step 126, the image data is read from the image memory 11 and is transmitted through the infrared commuication (step 127).

If no CR mode is set at step 124, whether or not the RC mode is set is checked at step 128. If the RC mode is set at step 128, whether or not the RC mode reset command is input is checked at step 129. Note that the RC mode reset command is input when any of the switches of the still video camera 2 is actuated at the RC mode before receipt of the image data, i.e., before the image data transmitted from the remote controller 3 is received.

If the RC mode reset command is input at step 129, the RC mode is released at step 130. Consequently, a neutral position (neither the record mode, the reproduction mode, the erase mode, the CR mode, nor the RC mode) is established.

If no RC mode reset command is input at step 129, whether or not the image data receipt commences is checked at step 131. If no image data is received at step 131, the control is returned to step 129 to perform the operations at steps subsequent to step 129. Conversely, if the receipt of the image data is commenced at step 131, the received image data is transferred to and recorded in the image memory 11 (step 132).

Thereafter, the image is reproduced (step 133). Subsequently, whether or not the record trigger is detected is checked at step 134. If the record trigger is detected at step 134, the image data is read from the image memory 11 and is recorded in the flash memory 15 (step 135). If no record trigger is detected at step 134, whether or not a predetermined time T has lapsed is checked at step 136. Note that the time T is predetermined to be an appropriate value. If no time T has lapsed at step 136, the control is returned to step 134 to perform the operations step 134. If the time T has lapsed or after the operation at step 135 is completed, the reproduction is stopped (step 137).

If the remote controller release switch 561 is OFF at step 113, if no reproduction trigger is detected at step 116, if no erase trigger is detected at step 122, if no transmission trigger is detected at step 125, if no image data is written in the image memory 11 at step 126, or if no RC mode is set at step 128, the control is returned to step 101 to perform the operations at steps subsequent to step 101. After the image data is recorded at step 114, reproduction is stopped at step 118 and step 137, reproduction is started at step 120, the RC mode is released at step 130 and the data in flash memory is erased at step 123, the control is returned to step 101 to perform the operations subsequent to step 101.

Figure 12:
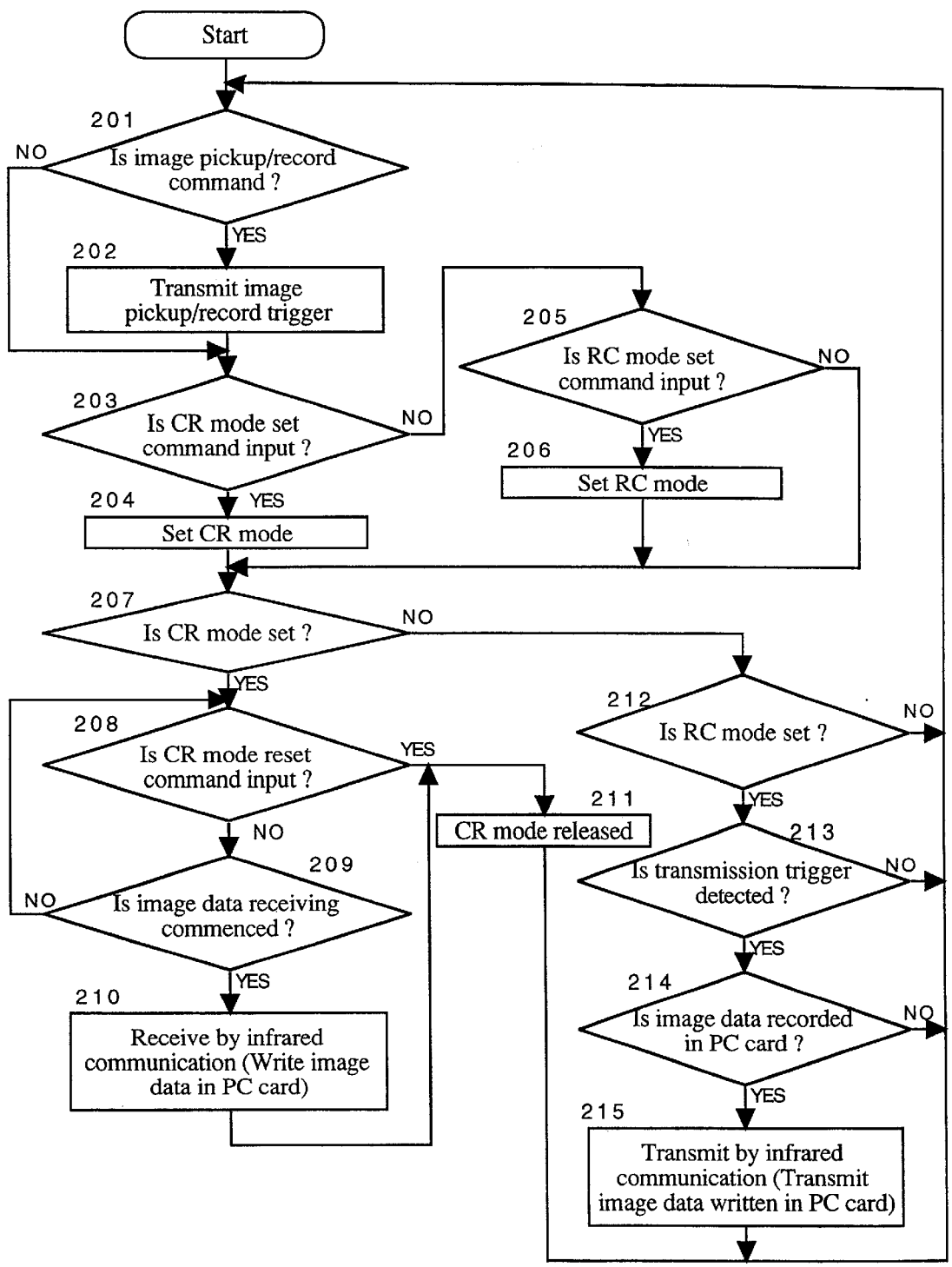
FIG. 12 is a flow chart of a control operation of a system control circuit of a remote controller according to the present invention.

The system control circuit 41 of the remote controller 3 will be discussed below, with reference to FIG. 12 which shows a flow chart of the control operation of the system controller 41.

Whether or not the image pickup/record command is input is checked (step 201). If the image pickup/record command is input at step 201, the image pickup/record trigger is transmitted (step 202). If no image pickup/record command is input or if the operation at step 202 is completed, whether or not the CR mode set command is input is checked (step 203). If the CR mode set command is input, the CR mode is set (step 204). Conversely, if no CR mode set command is input, whether or not the RC mode set command is input is checked (step 205).

If the RC mode set command is input at step 205, the RC mode is set (step 206). If no RC mode set command is input at step 205 or after step 204 or 206, whether or not the CR mode is set is checked (step 207). If the CR mode is set at step 207, whether or not the CR mode reset command is input is checked (step 208). Note that the CR mode reset command is input when the CR mode reset switch 563 is actuated as mentioned above.

If no CR mode reset command is input at step 208, whether or not the image data is received is checked (step 209) If no image data is received at step 209, the control is returned to step 208 to perform the operations after step 208 If the image data is received at step 209, the received image data is recorded in the memory of the PC card 71 (step 210). Thereafter, or if the CR mode reset command is input at step 208, the CR mode is released (step 211). Consequently, a neutral position (not the CR mode or RC mode) is established.

If no CR mode is set at step 207, whether or not the CR mode is set is checked at step 212. If the RC mode is set at step 212, whether or not the transmission trigger is detected is checked at step 213. If the transmission trigger is detected, whether or not the image data is recorded in the memory of the PC card 71 is checked at step 214.

If the image data is recorded in the memory of the PC card 71, the image data is read from the memory of the PC card 71 and is transmitted using the infrared communication (steps 214 and 215).

If no RC mode is set at step 212, if no transmission trigger is detected at step 213, if no image data is recorded in the memory of the PC card 71, or if steps 211 or 215 are complete, the control is returned to step 201 to carry out the operations at steps subsequent thereto.

As can be seen from the foregoing, in the camera system 1 according to the present invention, data regarding the picked-up image is transmitted from the still video camera 2 to the remote controller 3, so that the image data can be recorded in the memory of the PC card 71 by the remote controller 3. Namely, frames of images surpassing the storage capacity of the flash memory 15 of the still video camera 2 can be picked-up and stored.

In comparison with a known system in which the image data is transmitted to a personal computer and is recorded in a memory of the personal computer, the size of the camera system according to the present invention can be reduced. Thus, in the present invention, the camera system can be easily carried by a user and the image data of the picked-up image can be copied in the memory of the PC card 71 at site.

In comparison with a known system in which a still video camera is provided with a card slot in which a PC card (recording medium) on which the image data is recorded can be detachably attached, the still video camera according to the present invention can be made small and simplified.

In the camera system 1, the image data stored in the memory of the PC card 71 is transmitted to the still video camera 3 from the remote controller 3, so that the image data can be reproduced by the still video camera 2 or can be recorded in the flash memory 15. Consequently, the image data transmitted from the still video camera 2 to the remote controller 3, i.e., the image data stored in the memory of the PC card 71 can be transmitted to the still video camera 2 from the remote controller 3 and can be monitored by the LCD monitor 18 to visually confirm the image.

Since the image data is transmitted by the infrared communication (radio communication), the operation is less troublesome and simpler than the operation in a wire-communication system.

Moreover, communication between the still video camera 2 and the remote controller 3 can also be achieved when the remote controller 3 is attached to the still video camera 2. Namely, if the remote controller 3 is attached to the still video camera 2, the image data of the picked-up image can be recorded in the memory of the PC card 71.

Thus, if the remote controller 3 is not used to remotely control the image pickup operation (release operation) of the still video camera, the remote controller 3 is attached to the still video camera 2, so that the camera system 1 can be used as a camera with a card slot for a card type detachable recording medium.

Therefore, the remote controller 3 is not obstructive when it is not used to remotely control the image pickup operation of the still video camera. Furthermore, not only can the remote controller 3 be effectively used, but also the probability that a user lses or leaves the remote controller 3 can be reduced.

The recording medium which can be detachably attached to the remote controller is not limited to the PC card in accordance with the PCMCIA standard and can be, for example, a memory card, an optical recording medium, an optomagnetic recording medium, or a magnetic recording medium, etc.

A second embodiment of the camera system according to the present invention will be discussed below. The elements corresponding to those in the first embodiment are designated with like reference numerals and no duplicate explanation thereof will be given hereinafter. The following discussion will be addressed to the main differences between the first embodiment and the second embodiment.

Figure 13:
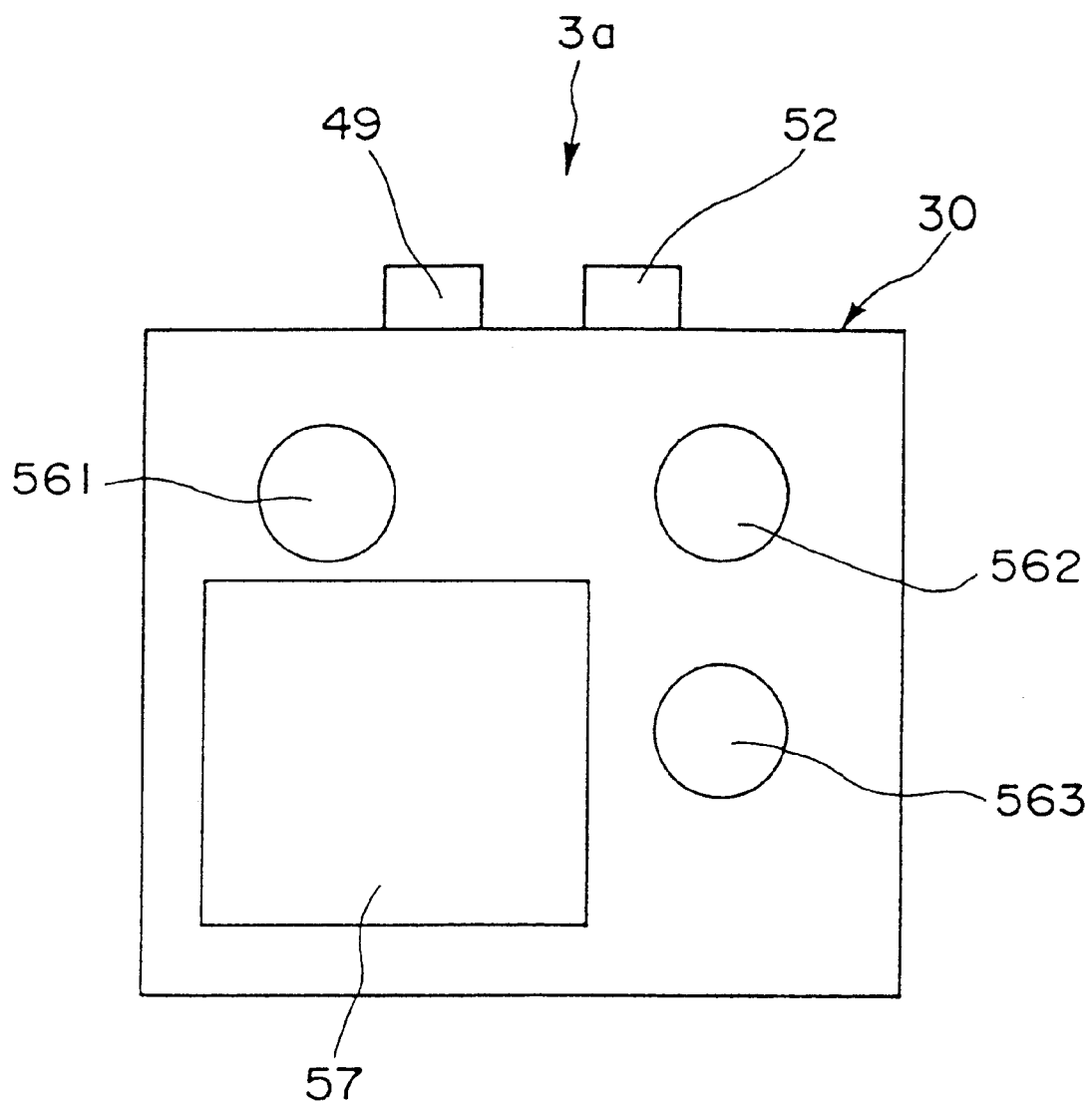
FIG. 13 is a front elevational view of a remote controller in a camera system according to a second embodiment of the present invention; and, FIG. 14 is a block diagram showing circuitry of the remote controller shown in FIG. 13.
Figure 14:
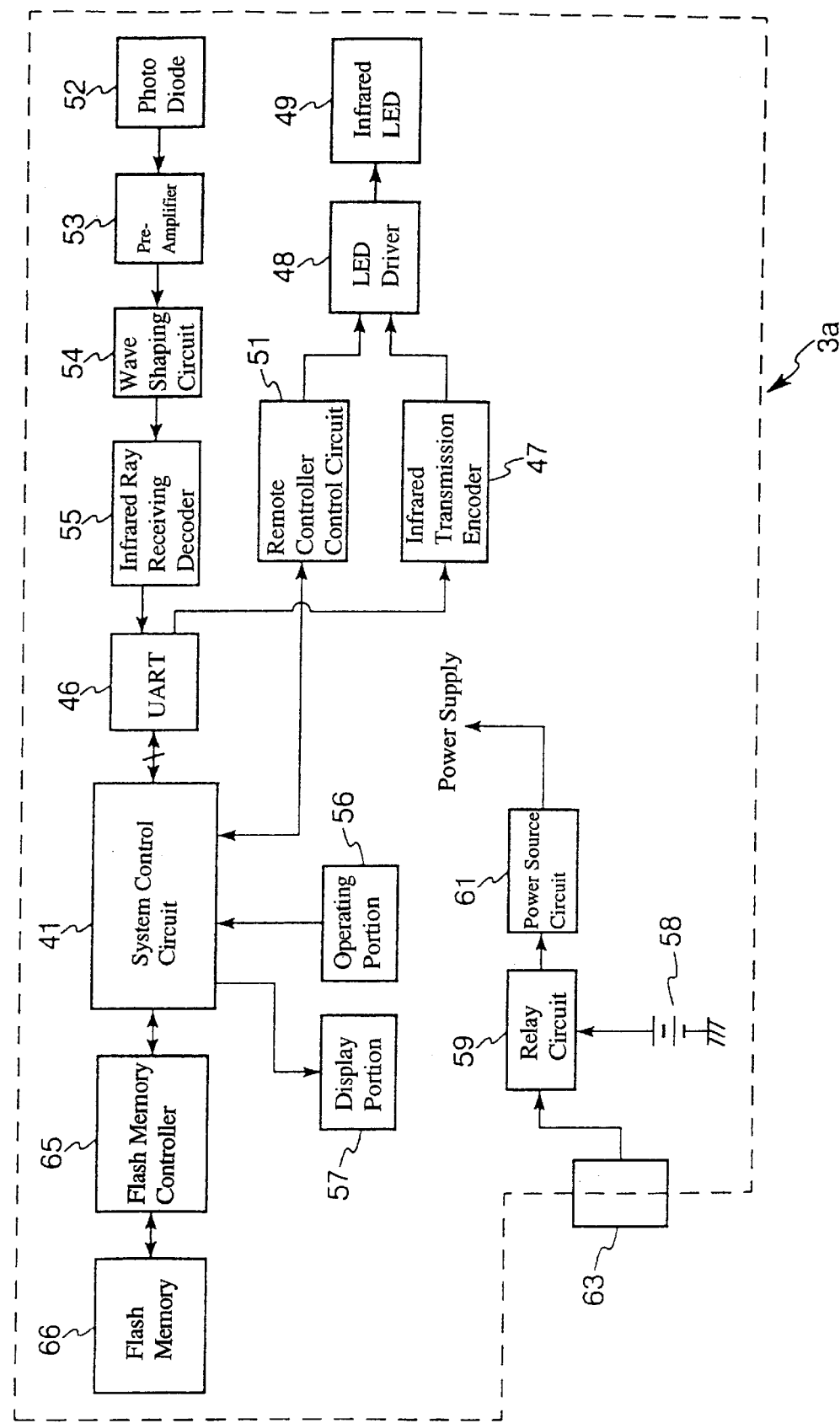

FIG. 13 is a front elevational view of a remote controller in a camera system according to the second embodiment of the present invention and FIG. 14 is a block diagram of a control circuit of the remote controller shown in FIG. 13, respectively.

As can be seen in FIG. 14, the remote controller 3a in the second embodiment includes a flash memory 66 (i.e., a nonvolatile memory in which data can be rewritten) in which the image data is recorded, and a flash memory control circuit 65 which controls the operation of the flash memory 66. The storage capacity of the flash memory 66 is identical to or greater than that of the flash memory 15 of the still video camera 2.

Note that the remote controller 3a does not have a card loading portion, a card conveyance mechanism, or an injector lever.

The remote controller 3a operates as follows.

When the mode selection switch 562 is actuated in the neutral position, the RC mode set command is input to the system control circuit 41. Similarly, the erase mode set command and the CR mode set command are input to the system controller 41 when the mode selection switch 562 is actuated at the RC mode and at the erase mode, respectively. Also, when the CR mode reset switch 563 is turned ON at the CR mode, the CR mode reset command is input to the system control circuit 41.

The system controller 41 selectively sets. "CR mode", "RC mode", or "erase mode", in accordance with the mode set command.

The system controller 41 releases the CR mode when the CR mode set command is detected. Consequently, the neutral position is established.

To erase the image data recorded in the flash memory 66, the user actuates the operating portion 56 of the remote controller 3a to select a desired image (i.e., image to be erased). Consequently, the frame number of the selected image is indicated in the display portion 57.

When the release switch 561 of the remote controller is turned ON at the erase mode, the erase trigger is input to the system control circuit 41. The erase is carried out in accordance with the detection of the erase trigger. Namely, the digital image signal (image data) recorded at a predetermined address of the flash memory 66 is erased therefrom by the flash memory control circuit 65 in response to the detection of the erase trigger by the system controller 41. Note that other operations and structure are substantially identical to those in the camera system 1 of the first embodiment.

In the second embodiment, a number of image frames exceeding the storage capacity of the flash memory 15 of the still video camera 2 can be picked-up and recorded, as in the first embodiment. Consequently, not only can the camera system be made smaller and simpler, but also the image data recorded in the flash memory 66 of the remote controller 3a can be reproduced and monitored by the LCD monitor 18 to visually confirm the image. Moreover, the remote controller 3 is not obstructive when it is not used to remotely control the image pickup operation of the still video camera. Furthermore, not only can the remote controller 3 be effectively used, but also the possibility that a user loses or leaves the remote controller 3 can be minimized.

In the second embodiment, since the remote controller 3a is provided with the flash memory 66 incorporated therein, which stores the image data, that is, since the remote controller 3a has no card loading portion, no card conveyance mecharnsm or no injector lever, etc., the remote controller 3a can be made smaller and simpler than the remote controller 3 in the first embodiment.

The recording medium incorporated in the remote controller is not limited to flash memory, and can be, for example, a nonvolatile memory in which data can be rewritten, an optical recording medium, an optomagnetic recording medium, or a magnetic recording medium, etc.

The still video camera, the remote controller, and the camera system of the present invention are not limited to those of the illustrated emboments.

For instance, in the present invention, it is possible to automatically erase the image data (i.e., the image data transmitted to the remote controller 3) recorded in the flash memory 15 in order to pick-up and record the subsequent image data after the first image data is transmitted to the remote controller 3 from the still video camera 2 or in order to record the image data transmitted from the remote controller 3 to the still video camera 2 into the flash memory 15.

In the present invention, it is also possible to record the image signal (image data) for a plurality of images in the recording medium (flash memory) of the still video camera.

The recording medium of the still video camera is not limited to the flash memory and can be, for example, a nonvolatile memory in which data can be rewritten, an optical recording medium, a photomagnetic recording medium, or a magnetic recording medium, etc.

As can be understood from the above discussion, according to the present invention, the image data of the picked-up image is transmitted from the still video camera to the remote controller, so that the image data can be recorded by the remote controller into the recording medium thereof. Namely, it is possible to record the image data of a number of image frames exceeding the storage capacity of the recording medium of the still video camera.

In comparison with a known system in which the image data is transmitted to a personal computer and is recorded in a memory of the personal computer, the camera system according to the present invention can be made smaller Thus, in the present invention, the camera system can be easily carried by a user and the image data of the picked-up image can be transmitted at site from the still video camera to the remote controller and recorded in the recording medium of the remote controller.

Comparing with a known system in which a still video camera is provided with a slot, etc., in which a recording medium on which the image data is recorded can be detachably attached, the still video camera according to the present invention can be made small and simplified.

What is claimed is:

1. A still video camera which receives a command signal from a remote controller through a radio communication, so that at least an image pickup operation of said camera can be controlled in accordance with said command signal, the camera comprising:

an image pickup device;

a recording medium provided in said camera on which image data of an object image picked-up by said image pickup device is recorded;

a recording device provided in said camera that records said image data on said recording medium;

a signal receiver provided in said camera that receives said command signal from said remote controller;

a signal transmitter provided in said camera that radio-transmits said image data to said remote controller; and a remote controller mounting portion to which said remote controller can be detachably attached, the remote controller having a second recording medium, wherein said image data can be radio-transmitted to said remote controller to be recorded on said second recording medium, when said remote controller is attached to said remote controller mounting portion as well as when said remote controller is detached from said remote controller mounting portion.

2. The still video camera according to claim 1, wherein said remote controller mounting portion and said remote controller are each provided with magnets arranged so that each magnet of said remote controller opposes a corresponding magnet of said remote controller mounting portion when said remote controller is mounted to said remote controller mounting portion.

3. The still video camera according to claim 2, wherein a polarity of said magnets of said remote controller mounting portion is opposite to a polarity of said corresponding magnets of said remote controller.

4. The still video camera according to claim 1, further comprising a controller provided in said camera that controls an operation of at least said image pickup device, said recording device, and said signal transmitter.

5. The still video camera according to claim 1, the second recording medium of the remote controller being detachably attachable to the remote controller.

6. The still video camera according to claim 1, wherein the signal receiver further receives image data transmitted from the remote controller, and wherein the recording medium provided in the camera further records the image data received from the remote controller.

7. The still video camera according to claim 1, wherein the signal receiver is movable and is moved to a position where the signal receiver faces the remote controller, when the remote controller is attached to the camera.

* * * * *